(12) United States Patent
Nowatzyk (10) Patent No.: US 10,018,818 B2
(45) Date of Patent: Jul. 10, 2018

(54) STRUCTURED STANDING WAVE MICROSCOPE

(75) Inventor: Andreas G. Nowatzyk, San Jose, CA (US)

(73) Assignee: PhotoNanoscopy Corporation, Sherman Oaks, CA (US)

(*) Notice: Subject to any disclaimer, the term of this patent is extended or adjusted under 35 U.S.C. 154(b) by 2597 days.

(21) Appl. No.: 14/648,694

(22) PCT Filed: May 15, 2008

(86) PCT No.: PCT/US2008/063774
§ 371 (c)(1),
(2), (4) Date: Nov. 3, 2015

(87) PCT Pub. No.: WO2008/144434
PCT Pub. Date: Nov. 27, 2008

(65) Prior Publication Data
US 2016/0048010 A1    Feb. 18, 2016

Related U.S. Application Data (60) Provisional application No. 60/938,436, filed on May 16, 2007.

(51) Int. Cl.
*G02B 21/06* (2006.01)
*G02B 21/16* (2006.01)
(Continued)

(52) U.S. Cl.
CPC .......... *G02B 21/0056* (2013.01); *G02B 5/32* (2013.01); *G02B 21/0072* (2013.01); *G02B 21/0084* (2013.01); *G02B 21/16* (2013.01); *G02B 21/26* (2013.01); *G02B 21/33* (2013.01); *G02B 21/361* (2013.01); *G02B 26/0808* (2013.01); *G02B 26/0858* (2013.01); *G02B 27/58* (2013.01)

(58) Field of Classification Search
None
See application file for complete search history.

(56) References Cited

U.S. PATENT DOCUMENTS 5,394,268 A * 2/1995 Lanni .................... G02B 21/06
                                                      359/368
5,801,881 A    9/1998 Lanni
(Continued)

FOREIGN PATENT DOCUMENTS

WO    2008144434 A1    11/2008

OTHER PUBLICATIONS

International Search Report and Written Opinion dated Aug. 15, 2008, regarding PCT/US08/63774.

*Primary Examiner* — Derek S Chapel
(74) *Attorney, Agent, or Firm* — Arent Fox LLP (57) ABSTRACT

Described herein is a method and apparatus that may be used in various applications, such as medical diagnosis and conducting research. In one embodiment, the subject matter extends upon the principle of standing wave microscopy by improving the resolution of subject specimen images in all three dimensions, thus achieving near isotropic resolution improvement that allows full three dimensional imaging of the subject specimen beyond the optical resolution limits of the objective lens and without the complexity and cost associated with 4p microscopy.

33 Claims, 3 Drawing Sheets

(51) Int. Cl.
*G02B 21/00* (2006.01)
*G02B 21/33* (2006.01)
*G02B 27/58* (2006.01)
*G02B 5/32* (2006.01)
*G02B 21/26* (2006.01)
*G02B 21/36* (2006.01)
*G02B 26/08* (2006.01)

(56) References Cited

U.S. PATENT DOCUMENTS

| | | | |
|---|---|---|---|
| 6,055,097 A * | 4/2000 | Lanni | G02B 21/06 359/368 |
| 7,151,246 B2 | 12/2006 | Fein | |
| 2001/0021058 A1 | 9/2001 | McClelland | |
| 2003/0182246 A1 | 9/2003 | Johnson | |
| 2005/0173380 A1 | 8/2005 | Carbone | |
| 2013/0093871 A1 * | 4/2013 | Nowatzyk | G02B 21/14 348/79 |

* cited by examiner

STRUCTURED STANDING WAVE MICROSCOPE

FIELD OF THE SUBJECT MATTER

The present subject matter relates to devices and methods for standing wave microscopy, having a reflective diffractive optical element for greater resolution of the subject specimen under investigation.

BACKGROUND OF THE SUBJECT MATTER

All publications herein are incorporated by reference to the same extent as if each individual publication or patent application was specifically and individually indicated to be incorporated by reference. The following description includes information that may be useful in understanding the present subject matter. It is not an admission that any of the information provided herein is prior art or relevant to the presently claimed subject matter, or that any publication specifically or implicitly referenced is prior art.

Microscopy is a central tool in both the structural and functional study of biological systems. While light microscopy is of great utility, it is subject to several well-known limitations. Foremost among these is the resolution limit. The resolution limit of a light microscope is traditionally defined by the Rayleigh criterion, which is approximately $$R = \frac{1.22\lambda}{2n\sin\alpha} = \frac{0.61\lambda}{NA}$$

where $\lambda$ is the wavelength, n is the index of refraction, and $\alpha$ is the half-angle of the maximum cone of light that can enter the entrance aperture of the objective lens. The term $n \sin \alpha$ is often referred to as the numerical aperture ("NA"). As an example, in the context of light microscopy, a 40× oil immersion objective with a NA of 1.47 operating at a wavelength of 450 nm may resolve two points if they are at least 190 nm apart.

The Rayleigh criterion stems from the fact that electromagnetic waves are subject to diffraction and thus, there is a fundamental limit. Therefore, improving resolution requires either reducing the wavelength, which is not practical in biological applications, or increasing the numerical aperture. The latter is limited by the fact that $\alpha$ cannot exceed 90 degrees for physically realizable objectives.

One existing approach to increase the numerical aperture of a light microscope is to use two objectives to observe the subject specimen from opposing sides simultaneously. If both images are combined optically, the effective numerical aperture is doubled. This method has been reduced to practice and is identified as $4\pi$ microscopy (also know as 4PI or Scan4pi). $4\pi$ microscopy is derived from the fact that $\alpha$ can approach 90 degrees for an advanced microscope objective and that two of these objectives almost cover the full solid angle, which is $4\pi$srad. However, $4\pi$ microscopy requires the light from both objective lenses to be combined optically which requires precise alignment of the lenses. This need for precision leads to extreme alignment difficulties, which make $4\pi$ microscopy rather impractical and expensive.

An alternative to $4\pi$ microscopy is standing wave microscopy (see e.g., U.S. Pat. Nos. 5,671,085; 5,394,268; 5,801,881; 6,055,097; RE38,308; and 4,621,911). In standing wave microscopy a mirror is placed directly behind the subject specimen in an epi-fluorescence microscope. The subject specimen is illuminated through the microscope objective lens, and light passes through the subject specimen under investigation and is reflected back towards the objective lens by the mirror behind the subject specimen. Thus, the illumination light traverses the subject specimen twice, once from the objective lens towards the mirror and once from the mirror to the objective lens. In cases where the distance from the subject specimen to the mirror is less than half of the coherence length of the illumination light, an interference pattern that is periodic along the optical (z) axis will be observed:

$$I(z) = |E_{forward}(z) = E_{backward}(z)| = \left(E_0\sin\left(\omega t + \frac{zn}{\lambda}\right) + E_0\sin\left(\omega t + \frac{n(2z_m - z)}{\lambda}\right)\right)^2$$

where z is the distance from the objective lens, $E_0$ is the electrical field strength (also referred to as disturbance), $\lambda$ is the wavelength of the light in a vacuum, n is the index of refraction, $$\omega = 2\pi f = \frac{2\pi c}{\lambda}$$

is the angular frequency of the light in $$\frac{rad}{s},$$

t is the time and $z_m$ is the distance from the objective lens to the mirror. Integrating over one wave cycle leads to the observed average intensity:

$$I(z) = E_0^2 8\pi\left(1 + \cos\left(\frac{n}{\lambda}(2z_m - 2z)\right)\right) \approx 1 + \cos\left(\varphi - \frac{2n}{\lambda}z\right)$$

The significant property of this interference pattern is that its period is half that of the wavelength of the excitation light. In standing wave microscopy, this property is used to increase the axial resolution of the microscope. For this purpose, several images are obtained from the subject specimen by moving the mirror by a fraction of the wavelength, in the z-axis, relative to the stationary subject specimen and microscope objective. The images obtained in this fashion show only part of the subject specimen, namely the region which is illuminated by an interference maxima. Thus, it is possible to obtain a sequence of images, each corresponding to a different subject specimen depth. Because the interference pattern is periodic, the images obtained will contain features from multiple slices in instances where the subject specimen depth exceeds one-half of the wavelength and the extent of the objective's point spread function in the z-axis is greater than the interference pattern period. However, even in this case, standing wave microscopy is useful because it imposes a sharp axial structure on the point spread function which in turn aids deconvolution algorithms.

Standing wave microscopy can be combined with other microscopy methods, such as two-photon excitation and confocal microscopy to further improve the resolution along the z-axis and to resolve ambiguities that stem from the periodic nature of the interference pattern. Using standing wave microscopy, axial resolutions down to approximately 5 nm have been demonstrated. Standing wave effects have also been observed in photo-lithography, where the partial reflection from the substrate causes a periodic interference pattern perpendicular to the substrate surface, which in turn causes uneven exposure of the photo-resist. In this context, standing waves are an unwanted effect that degrades the performance of the photo-resist mask.

However, the primary constraint of standing wave microscopy stems from the fact that the interference pattern is produced by two counter-propagating planar or nearly planar wave-fronts. Thus, the interference pattern is periodic only along the z-axis axis and has no significant reading in the x-axis or y-axis. Therefore, only the resolution along the z-axis is improved, while the resolution along the x-axis and y-axis remains unchanged.

Accordingly, there is a need in the art for a method capable of improving resolution in wave microscopy. Furthermore, there exists a need in the art for a method capable of producing finite three-dimensional images of biological specimens in wave microscopy. To address these techniques, there is also a need in the art to develop a device that can improve resolution in wave microscopy and produce finite three-dimensional images in wave microscopy, all while reducing the complexities and costs associated with existing wave microscopy devices.

BRIEF DESCRIPTION OF THE FIGURES

Exemplary embodiments are illustrated in the referenced figures. It is intended that the embodiments and figures disclosed herein are to be considered illustrative rather than restrictive.

DETAILED DESCRIPTION OF THE SUBJECT MATTER

All references cited herein are incorporated by reference in their entirety as though fully set forth. Unless defined otherwise, technical and scientific terms used herein have the same meaning as commonly understood by one of ordinary skill in the art to which this subject matter belongs.

One skilled in the art will recognize many methods, devices or materials similar or equivalent to those described herein, which could be used in the practice of the present subject matter. Indeed, the present subject matter is in no way limited to the methods, devices or materials described.

The present subject matter discloses a method and device that expands upon the principles of standing wave microscopy by introducing a reflective diffractive optical element that substantially improves upon the image resolution of a subject specimen, and provides such improved image resolution in all three dimensions, thus achieving near isotropic resolution improvement that allows full three dimensional ("3D") imaging of the subject specimen beyond the optical resolution limits of the objective lens. Furthermore, the subject matter accomplishes these feats with minimal complexity and cost, thus producing a method and device appropriate for immediate wide-spread application and use in the art.

This subject matter describes a new method and device that substantially improves upon the resolution of a light microscope by adding a reflective diffractive optical element ("RDOE"). The RDOE, which may be situated adjacent to the subject specimen, reflects the illumination light beam, produced in a conventional light microscope, back through the subject specimen towards the light source, causing a three-dimensional interference pattern throughout the subject specimen volume. Unlike ordinary standing wave microscopy, where the interference pattern is periodic along the z-axis and could be described as a series of planar disks perpendicular to the z-axis, the RDOE produces a more complicated interference pattern with high spatial frequency components in all three axes. This 3D interference pattern creates a fine substructure to the point spread function ("PSF") of the imaging optics, resulting in an effective PSF ("EPSF") with a detection pattern that has high spatial frequency components in all three dimensions.

The EPSF is effectively a cloud of small sub-regions within the original PSF from which light is detected. The RDOE is further mounted on a three-axis micro translation stage which allows for spatial manipulation of the RDOE, thus allowing the 3D interference pattern to be moved independently in all three axes, in a controlled fashion. By recording a series of images, each with a different 3D interference pattern, the subject specimen is imaged with many different EPSFs. While each individual image only contains the resolution of the original PSF, combining images with different EPSFs using a computer aided algorithm, similar to an inverse Radon transform, yields an image with a resolution consummate with the micro structure of the 3D interference pattern, which has been shown to be at least 2 times greater than the Rayleigh resolution limit of the microscope objective.

Figure 1:
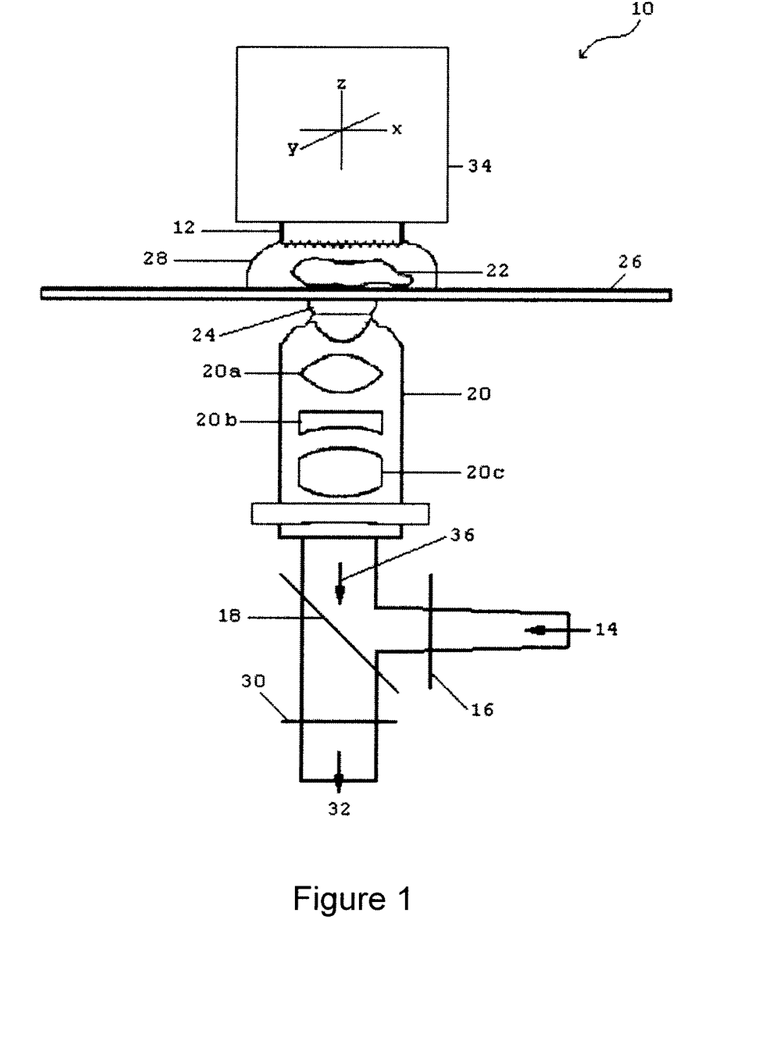
FIG. 1 depicts a structured standing wave microscope in accordance with an embodiment of the present subject matter.

FIG. 1 depicts one embodiment of the structured standing wave ("SSW") microscope 10, wherein an excitation light beam 14 is passed through an excitation filter 16 to eliminate residual light in the emission bands. The excitation light beam 14 is then passed through a dichroic beam splitter 18 and is directed into the microscope objective lens 20 comprising of: the biconvex lens 20a; the plano concave lens 20b; and double convex lens 20c. The objective lens 20 focuses the excitation light beam 14 onto the subject specimen 22. FIG. 1 further depicts the use of a standard oil-immersion objective 24, which uses a drop of transparent oil to couple the objective lens 20 to a cover slip 26 which carries the subject specimen 22. The subject specimen 22 is affixed to the opposing surface of the cover slip 26 and is immersed in water 28. Alternatively, the use of immersion oil and water may be omitted, as they are not necessary to the principle of SSW microscopy, and SSW microscopy is likewise effective if air spacing were to be used. However, for high resolution microscopy, the increase in numerical aperture due to the higher index of refraction of oil and water boosts the attainable resolution. Hence high magnification objective lenses are typically constructed for use with immersion of oil and/or water.

A RDOE 12 is affixed adjacent to the subject specimen 22, and further mounted on a three-axis translation stage 34, which allows the RDOE 12 to be moved in the x, y, and z axes. The excitation light beam 14 is omitted through the subject specimen 22, and is reflected back through the subject specimen 22 by the RDOE 12. The reflected light from the RDOE 12 creates an interference pattern with the incident excitation wavefront throughout the subject specimen 22 volume. The interference pattern created by the RDOE 12 has a complex, three-dimensional structure with sharp contrast in all three dimensions. This interference pattern is a function of the RDOE 12 position and can be moved over the subject specimen 22 volume in a controlled fashion.

The emission light beam 36 from the subject specimen 22 is observed by the objective lens 20. The emission light beam 36 passes subsequently through the dichroic beamsplitter 18 and the emission filter 30, which blocks reflected excitation light. The tube lens 32 forms a virtual image, which may be projected with a relay lens onto a charge-couple device image sensor (also known as "CCD image sensor") that records the image.

The resolution of the translation stage 34 must be calibrated to be smaller than the wavelength of the excitation light beam 14. For example, a commercial piezoelectric actuator with capacitive feedback can achieve repeatable, controlled motion on a sub-nanometer scale, which is sufficient for SSW microscopy.

A SSW micro-image is acquired by recording a series of images, each with a different position of the RDOE. In one embodiment, the RDOE is the only optical component that is moved; all other optical components and the subject specimen would remain stationary. Each image that is recorded in the sequence shows the subject specimen with the conventional resolution of the microscope, limited by the Rayleigh criterion. However, the point spread function (PSF) of each image point are convolved with the 3D interference pattern created by the RDOE. Thus, while a particular pixel in the acquired image sequence will always show the same region of the subject specimen, this region will be illuminated with a different structure in each image. Thus, the effective PSF is created by multiplying the PSF of the microscope optics with the intensity distribution of the three-dimensional interference pattern created by the RDOE. The SSW micro-image is then reconstructed computationally by performing an inverse radon transformation, which is similar to the process employed in magnetic resonance imaging ("MRI") and computer aided topography ("CAT") imaging, which vary in different system matrix. For example, in a CAT scan, each sensor records the X-ray density along a straight line through the subject specimen. Conversely, in SSW microscopy, each sensor, which is one pixel from the charge couple device ("CCD") camera, records the total emitted light from a subject specimen volume that is defined by the EPSF. It should be noted that EPSFs form the same pixel, but in different images of a SSW acquisition sequence will overlap in general, just as the X-ray paths that contribute to one CAT scan will intersect. Thus, like CAT and MRI imaging, the images obtained from SSW microscopy do not directly form a high resolution three-dimensional image, rather they require algorithm calculations by a computer for final computation of the desired image.

It follows from the outline of the SSW image acquisition procedure above, that the image reconstruction procedure requires knowledge of the shape of the 3D interference pattern and the PSF of the microscope optics. The interference pattern in turn depends on the actual wavefront of the excitation light beam and the optical geometry of the interfaces between the objective lens, the cover slip, the subject specimen, the RDOE and its precise position. It is generally not practical to predict the shape of this interference pattern, rather SSW microscopy uses a calibration step that immediately precedes or is combined with the acquisition sequence. For this calibration sequence, small fluorescent particles, such as quantum dots, fluorescent microspheres, or low concentrations of fluorescent dye molecules, are embedded in the calibration slide or in the subject specimen. The fluorescent particles must be smaller than the operating wavelength. The density of these particles should be so low that the PSF volume of one pixel is at most one emitter. The actual position of the calibration particles is not important as long as they are stationary and do not move to different locations when the RDOE is moved. If the calibration particles are embedded in the subject specimen, it is possible to distinguish their signal from that of the subject specimen, for example, by means of a different emission wavelength. The calibration step then relies on the particles to calibrate the subject specimen for the interference pattern.

Figure 2:
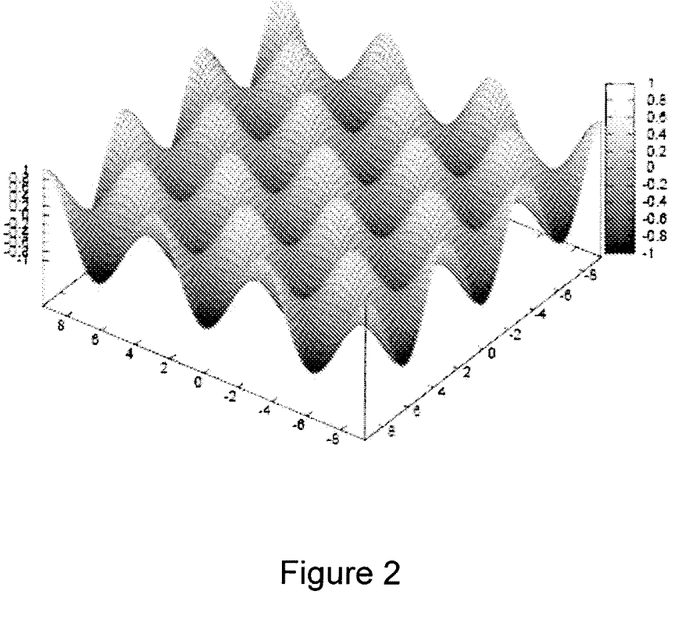
FIG. 2 graphically depicts a pattern of the reflective diffractive optical element in accordance with an embodiment of the present subject matter.
Figure 3:
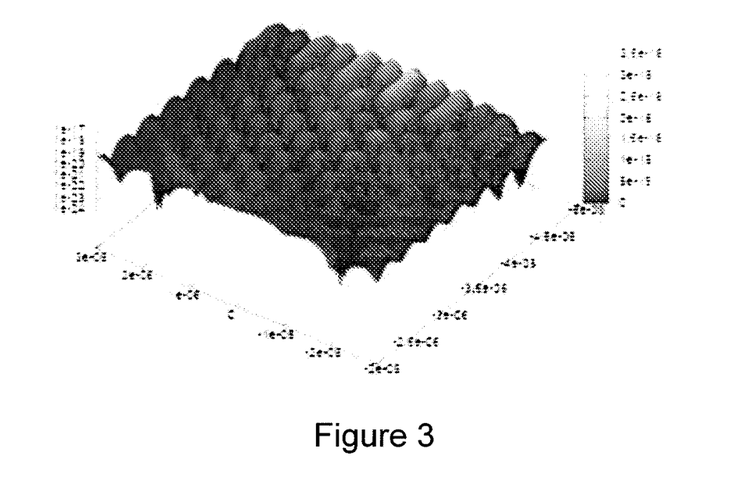
FIG. 3 graphically depicts an intensity distribution of the interference pattern in an axial slice (xz plane) for a Gaussian beam illumination at 750 nm and a pattern pitch of 2 µm with an amplitude of 0.285 µm in accordance with an embodiment of the present subject matter.
Figure 4:
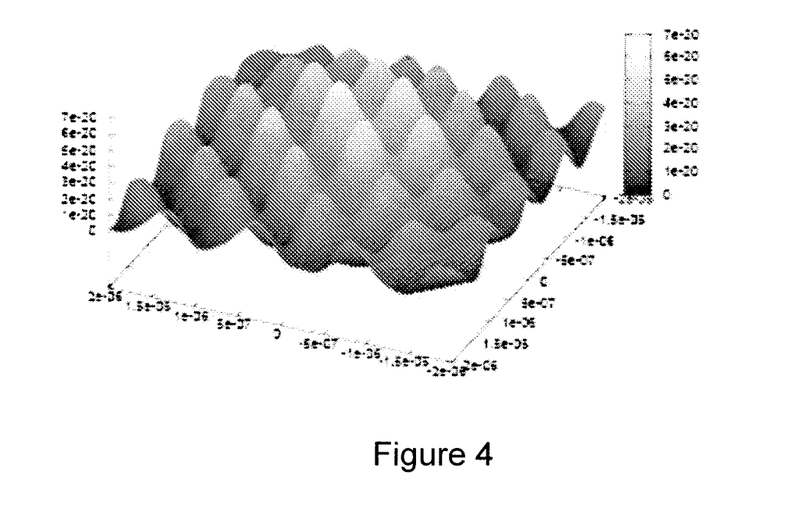
FIG. 4 graphically depicts an intensity distribution of the interference pattern in a plane perpendicular to the optical axis in accordance with an embodiment of the present subject matter.

The objective of the RDOE is to return the illumination light beam back through the subject specimen volume so that it creates an interference pattern with the incident illumination wavefront. For this purpose, the RDOE has a reflective surface, for example, using a metal coating employing aluminum, silver, gold or any other material that is highly reflective over the illumination wavelength range. Unlike a plain mirror surface, the RDOE is patterned so that the returned wavefront has a structure that distorts the returned wavefront. FIG. 2 depicts one possible RDOE pattern. In this case, a micrometer scale, periodic deformation is used to create the interference pattern. FIG. 3 depicts the intensity distribution along an axial slice in the xz plane, where the z-direction is parallel to the optical axis. FIG. 4 depicts the intensity distribution of the interference pattern, depicted in FIG. 2, in a plane perpendicular to the optical axis 4.5 μm in front of the RDOE when illuminated with a Gaussian beam of 750 nm light. This particular wavelength was chosen as an example to be used with two-photon excitation imaging. For ordinary excitation of the fluorescence, shorter wavelengths can be used. This scales the interference pattern, but does not substantially change its shape. Similarly, a RDOE could be constructed from a transmission DOE that is directly deposited onto the surface of a planar mirror.

The RDOE may be fabricated using processes similar to those employed in the production of reflective holograms that are commonly found as a security device on credit cards. In one embodiment, a master copy of the RDOE is fabricated in a hard material (for example nickel) and this master RDOE is then used to stamp its surface structure into a plastic substrate that may be softened via heating. The structured plastic surface is subsequently coated with aluminum to complete the RDOE. Alternative embodiments for fabrication of RDOEs include photo-lithographic processes and micro-machining with lasers or particle beams.

Alternatively, the RDOE structure may consist of patterns that produce pseudo-random interference profiles throughout the subject specimen volume. In one alternative embodiment, preliminary tests have shown that a rectangular array of pyramidal reflectors produces satisfactory results. In general, the RDOE is optimized to maximize the high spatial frequency components perpendicular to the optical axis. The excitation wavelength, the microscope geometry and the realizable excitation wavefront for a specific microscope objective is taken into account. For example, a converging excitation beam operates better with a RDOE that implements a spherical Fresnel reflector. In one embodiment, a spherical reflector is aligned so that its center nearly coincides with the focal point of the excitation wavefront. The reflector can be flattened and implemented as an RDOE, which consists of a series of circular zones, each being a thin slice of a spherical surface using the same principle as a Fresnel lens. In other embodiments, the excitation wavefront is converged on a point behind the subject specimen, which is due to the fact that the light traverses the objective lens that has a very short focal length. The RDOE takes this converging beam path into account to achieve good interference contrast, which requires that the intensity of the incident illumination light is approximately equal to the reflected light. The intensity ratio would be achieved locally, not globally, over the entire subject specimen volume, which is achieved by minimizing the distance between the subject specimen and the RDOE or by using RDOE that focus light similar to a spherical mirror, but with small distortions to create the required structure.

Another embodiment of the present subject matter provides a microscope comprising a RDOE to reflect the illumination light beam back through a subject specimen and towards the microscope objective lens. The inventive RDOE that may be used is further described below. In one embodiment, the microscope is configured such that the RDOE is behind a specimen. In another embodiment, the microscope is configured such that the coherence length of the illumination light beam source exceeds twice the distance from the subject specimen to the reflective mirror element. In another embodiment, the RDOE is configured to move with respect to the specimen and/or the objective lens in a controlled fashion. In another embodiment, the microscope is configured to move the specimen with respect to the objective lens and/or the reflective mirror element in a controlled fashion. Movement includes any actuation with 1 to 6 degrees of freedom.

In another embodiment, the microscope further comprises a dichroic beam-splitter in the excitation light beam path that allows the illumination of the specimen through the objective lens while observing the resulting fluorescence with an electronic camera or photographic media. The microscope may further comprise a filter to block reflective or refractive light from reaching a camera or a photographic media. The filters may be, for example, an emission filter or an excitation filter.

The present subject matter also describes a RDOE which creates an interference pattern within the subject specimen volume. The RDOE comprises facilities to structure the reflected wavefront so that it is not a planar wavefront. In one embodiment, the RDOE is a surface structure that is coated with a reflective layer. In another embodiment, the RDOE is created by depositing a structure dielectric layer on a mirror substrate. In another embodiment, the RDOE is created by a reflective layer deposited on a planar substrate that also has a set of transducers to create surface acoustic waves which in turn create a time varying deformation of the reflective mirror element. In another embodiment, the RDOE is a micro-machined electromechanical system (MEMS) that allows the surface to be deformed electrically.

The present subject matter further describes a method to obtain a high resolution image from a light microscope. The resolution of the high resolution image is improved along the x-axis, y-axis and z-axis. The method comprises providing a microscope comprising a reflective diffractive optical element ("RDOE"), acquiring a series of fluorescence images from a specimen and reconstructing the acquired images to generate the high resolution image. The RDOE is used to vary the interference pattern across the subject specimen volume.

In another embodiment, the method further comprises adding the point-like fluorescent markers throughout the specimen volume and separating the light emitted from the fluorescent markers from the light of the specimen to create a marker image. The light may be separated by its wavelength or its temporal characteristics. Point-like fluorescent markers include any fluorescent particle which is small compared to the wavelength of the illumination light beam, which includes but is not limited to quantum-dots, dye-beads, or individual dye molecules. The marker images obtained may be used to reconstruct a map of the interference pattern throughout the subject specimen volume. The marker images obtained may also be used to reconstruct the point spread function for each pixel of the image detection system.

In another embodiment, the method further comprises using a short pulse laser as an excitation source with sufficient instantaneous intensity to produce fluorescence via two-photon excitation. The excitation light beam source may be a wavelength that is twice the excitation wavelength of the fluorophore in the specimen.

In another embodiment, the method further comprises using an extra light-source tuned to a wavelength within the emission spectrum of the fluorophore in the specimen. This second light source causes stimulated emission depletion, which in turn reduces the fluorescence in areas with high intensities of the depletion light. Because the excitation and depletion wavelengths differ, each causes a different interference pattern throughout the subject specimen volume. This in turn causes borders with increased fluorescence contrast where an excitation interference maximum neighbors a depletion interference maximum. Because the attainable resolution depends on the contrast of the emission interference pattern, simulated emission depletion can yield an increase in spatial resolution.

The present subject matter further describes a method to reconstruct the acquired images obtained by the subject matter microscope. The method comprises obtaining an interference pattern and computing the shape of the interference pattern based on the geometry of the reflective mirror element and the measured and/or calculated wavefront of the illumination light beam from the objective lens.

A method of reconstructing a high resolution image of the specimen based on the image sequence obtained comprising acquiring a series of fluorescent images from a specimen using the inventive microscopy and computing the effective point spread function used to acquire each image. The effective point spread function may be computed by multiplying the point spread function of the image detection system with the interference pattern obtained via a method as described above. Further, the algebraic solution to the inverse radon transform using the conjugate gradient method may be used to reconstruct the high resolution image of the specimen. In one embodiment, there is no need to explicitly store the system matrix. Rather, the nonzero elements of the system matrix are computed on demand from a memory representation of the interference patterns and the point spread function. In another embodiment, a filtered back-projection algorithm may be used to solve the inverse radon transform.

The foregoing description of various embodiments of the subject matter known to the applicant at the time of filing this application has been presented and is intended for the purposes of illustration and description. The present description is not intended to be exhaustive nor limit the subject matter to the precise form disclosed and many modifications and variations are possible in the light of the above teachings. The embodiments described serve to explain the principles of the subject matter and its practical application and to enable others skilled in the art to utilize the subject matter in various embodiments and with various modifications as are suited to the particular use contemplated. Therefore, it is intended that the subject matter disclosed herein not be limited to the particular embodiments disclosed.

While particular embodiments of the present subject matter have been shown and described, it will be obvious to those skilled in the art that, based upon the teachings herein, changes and modifications may be made without departing from this subject matter and its broader aspects and, therefore, the appended claims are to encompass within their scope all such changes and modifications as are within the true spirit and scope of this subject matter. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. A device for standing wave microscopy of a sample, comprising:
    a microscope objective lens for magnifying the sample;
    an excitation light source for producing a light beam;
    a reflective diffractive optical element, adjacent to the sample, for reflecting the light beam produced by the excitation light source; and
    a tube lens for viewing a magnification of the sample,
    wherein the device is configured such that, in operation, the light beam enters the objective lens which directs the light beam onto the sample and the adjacent reflective diffractive optical element, wherein the reflective diffractive optical element reflects the light beam back through the objective lens and to the tube lens for viewing of a complex, three dimensional interference virtual image of the sample.

2. The device according to claim 1, further comprising a dichroic beam splitter situated at a position between the excitation light source and the objective lens, for reflection of the light beam.

3. The device according to claim 1, further comprising at least one excitation filter situated in the path of the light beam, for elimination of residual light.

4. The device according to claim 1, further comprising at least one emission filter situated in the path of the light beam, for elimination of reflected light.

5. The device according to claim 1, further comprising an oil-immersion objective for coupling the objective lens to the sample for altering numerical aperture due to the refractive index of oil.

6. The device according to claim 1, further comprising water coupled to the sample for altering numerical aperture due to the refractive index of water.

7. The device according to claim 1, further comprising a relay lens affixed to the tube lens for projection of the complex, three dimensional interference virtual image of the sample.

8. The device according to claim 7, further comprising a charge-couple device image sensor for recording the complex, three dimensional interference pattern of the sample projected by the relay lens.

9. The device according to claim 1, wherein the reflective diffractive optical element is constructed from a transmission diffractive optical element that is directly deposited onto the surface of a reflective surface.

10. The device according to claim 1, wherein the reflective diffractive optical element is constructed from a reflective hologram.

11. The device according to claim 1, wherein the reflective diffractive optical element is constructed from a micro-machined electromechanical system, producing electronic deformation of a reflective surface.

12. The device according to claim 1, wherein the reflective diffractive optical element is constructed from depositing a structured dielectric layer on a reflective surface.

13. The device according to claim 1, wherein the reflective diffractive optical element is constructed from depositing a pseudo-random interference pattern on a reflective surface.

14. The device according to claim 1, wherein the reflective diffractive optical element is constructed from a spherical reflector.

15. The device according to claim 1, further comprising a second light source affixed to the objective lens.

16. The device according to claim 15, wherein the second light source is selected from the group consisting of a laser light, light emitting diodes, electric light and omni light.

17. The device according to claim 1, further comprising a three axis micro translation stage mounted to the reflective diffractive optical element.

18. The device according to claim 17, wherein the three axis micro translation stage is independently variable in all three axes.

19. The device according to claim 1, further comprising a photographic medium for recording images of the sample.

20. A method for obtaining a high resolution image of a sample from a light microscope comprising:
    providing a device comprising:
        a microscope objective lens for magnifying the sample;
        an excitation light source for producing a light beam;
        a reflective diffractive optical element, adjacent to the sample, for reflecting the light beam produced by the excitation light source; and
        a tube lens for viewing a magnification of the sample,
        wherein the device is configured such that, in operation, the light beam enters the objective lens which directs the light beam onto the sample and the adjacent reflective diffractive optical element, wherein the reflective diffractive optical element reflects the light beam back through the objective lens and to the tube lens for viewing of a complex, three dimensional interference virtual image of the sample;
    acquiring a fluorescent image of the sample from the device; and
    processing the fluorescent image of the sample to develop a high resolution three-dimensional image.

21. The method of claim 20, wherein two or more fluorescent images of the sample are acquired at varying positions in the x, y or z planes.

22. The method of claim 20, wherein the fluorescent image of the sample is processed using an inverse radon transform to develop the high resolution three-dimensional image.

23. The method of claim 20, wherein the fluorescent image of the sample is processed by computing an interference pattern of the reflective diffractive optical element, based on a reading of the geometry of the reflective diffractive optical element, and a reading of the calculated wavefront of the illumination light beam from the objective lens.

24. The method of claim 20, wherein the fluorescent image of the sample is processed by computing an effective point spread function of two or more pixels of the fluorescent image to develop the high resolution three-dimensional image.

25. The method of claim 20, wherein the reflective diffractive optical element is configured to reposition with respect to the sample and objective lens in a controlled fashion.

26. The method of claim 25, wherein repositioning of the reflective diffractive optical element includes any actuation within one to six degrees of freedom.

27. The method of claim 20, wherein the sample is configured to reposition with respect to the reflective diffractive optical element and objective lens in a controlled fashion.

28. The method of claim 27, wherein repositioning of the sample includes any actuation within one to six degrees of freedom.

29. The method of claim 20, wherein the device further comprises a point-like fluorescent marker and the method comprising introducing a point-like fluorescent marker throughout the sample to create a marker image.

30. The method of claim 20, wherein the device further comprises a short pulse laser and the method comprising using a short pulse laser as an excitation source for producing fluorescence.

31. The method of claim 20, wherein the device further comprises a second light source and the method comprising using a second light source as an excitation source for producing fluorescence.

32. The method of claim 20, wherein the high resolution three-dimensional image is developed by recording a series of multiple fluorescent images at different optical positions.

33. The method of claim 20, wherein the device further comprises calibrating the interference pattern of the reflective diffractive optical element using a point-like fluorescent marker which is selected from the group consisting of quantum dots, dye-beads and fluorescent particles smaller than the wavelength of the excitation light beam.

* * * * *